United States Patent [19]
Grygierczyk et al.

[11] 3,711,213
[45] Jan. 16, 1973

[54] MULTIPLE-SPINDLE ARRANGEMENT FOR TAPPING HOLES IN SMALL WORKPIECES, NUTS IN PARTICULAR

[75] Inventors: Franciszek Grygierczyk; Zygmunt Falkowski, both of Czechowice-Dziedzice, Poland

[73] Assignee: Fabryka Sprzetu Elektrotechnicznego "Kontakt", Czechowice-Dziedzice, Poland

[22] Filed: Dec. 13, 1968

[21] Appl. No.: 783,511

[30] Foreign Application Priority Data

Dec. 27, 1967 Poland .......................P. 124318

[52] U.S. Cl. .......................408/43, 10/130, 10/132, 10/139, 408/53, 408/129
[51] Int. Cl. ...........................B23g 1/08, B23g 1/20
[58] Field of Search.10/129, 129 WH, 130, 130 WH, 10/132, 136, 139, 139 WH, DIG. 1; 408/43, 53, 69, 126, 129

[56] References Cited

UNITED STATES PATENTS

| 327,533 | 10/1885 | Cross | 10/132 |
|---|---|---|---|
| 504,971 | 9/1893 | Disston | 10/132 |
| 1,021,242 | 3/1912 | Fishburne | 10/130 |
| 1,996,368 | 4/1935 | Drissner | 10/130 |
| 2,875,650 | 3/1959 | Hazlinger | 10/130 |
| 1,592,009 | 7/1926 | Simpson | 10/129 |

FOREIGN PATENTS OR APPLICATIONS

| 365,248 | 11/1920 | Germany | 10/129 |

Primary Examiner—Charles W. Lanham
Assistant Examiner—E. M. Combs
Attorney—Stevens, Davis, Miller & Mosher

[57] ABSTRACT

A multiple-spindle arrangement for tapping holes in small workpieces and comprising: a spindle feed mechanism, a mechanism for reversing spindle rotation, a rotary head with working spindles slidably seated therein, and a holder disk secured to said head and provided on its periphery with sockets coaxial with the spindles for receiving therein the workpieces to be tapped.

4 Claims, 7 Drawing Figures

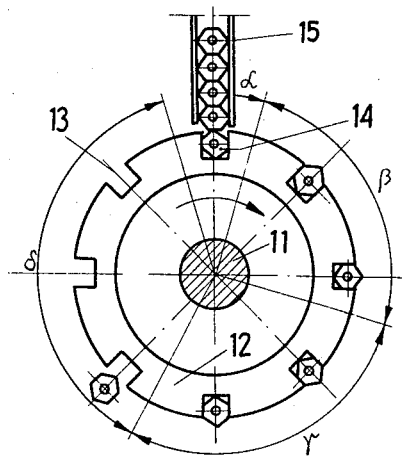
Fig. 3
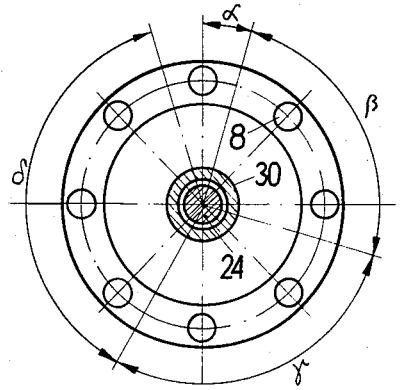
Fig. 4
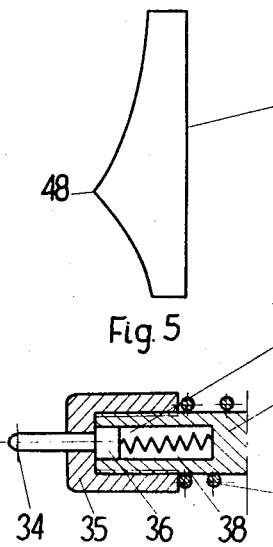
Fig. 5
Fig. 7
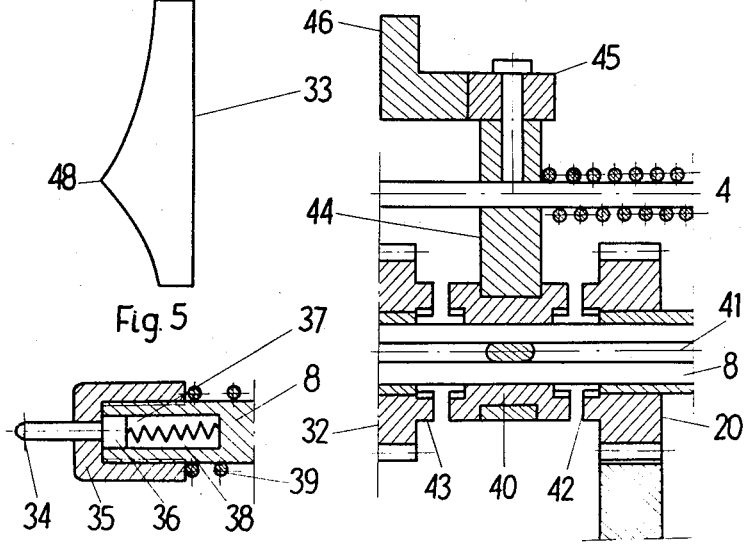
Fig. 6

MULTIPLE-SPINDLE ARRANGEMENT FOR TAPPING HOLES IN SMALL WORKPIECES, NUTS IN PARTICULAR

The present invention relates to a multiple- spindle arrangement for tapping holes in small workpieces, nuts in particular, by means of screw-taps and delivery of the untapped workpieces to the said arrangement through the agency of a self-acting mechanical feeder.

Polish Pat. No. 37,240 discloses "An arrangement for continuous tapping of holes in workpieces, e.g. nuts, by means of screw - taps mounted in spindle carrier spindles."

This known arrangement incorporates a spindle carrier with spindles inserted there-in and radially adjustable screw-taps, said spindles being designed to co-operate with a set of bevel gears alternatively engageable with two fixed toothed segments disposed on both sides of the carrier disk to produce a variable rotary motion of the screw-taps during each full revolution of the spindle carrier.

There are also known multiple-spindle arrangements for tapping nuts by means of the so-called stationary or moving bent screw-taps with continuous unidirectional working movement of the nuts or screw-taps, whereby the nuts after passing through the working part of the tool slide down the mandrels of the screw-taps which are smaller in diameter than their working part.

The aforementioned tapping machines have a lot of drawbacks. The arrangement as disclosed in Polish Pat. No. 37,240 does not provide the required accuracy of thread due to difficulty encountered in the mutual alignment of the nut and screw-tap. Difficulties arise also when trying to solve the problem of feeding the nuts, and the sudden reversal of rotation of the spindle with screw-taps mounted therein results in the breakage of the gear wheels. Besides, the complicated construction of the device in question makes it impossible to quickly change the tap-screws and, in the case of their damage, the percentage of discards rises seriously. For all these reasons, the known machines were found to be of little practical use.

The above-described known multiple-spindle arrangements for tapping nuts by means of bent screw-taps have also been found to have numerous imperfections. Difficulties were encountered in the first place when, it was desired to adapt the arrangement for tapping workpieces of various spatial forms, to mention only a variety of elements finding use in electrical equipment. No possibility is provided to ensure a quick replacement of screw-taps. Where continuous un-directional working movement of the tool with respect to nut, or vice versa, is involved there is always a likelihood of screw-tap contamination and its breakage. Moreover, the cost of a bent screw-tap is high compared to its operating life.

The object of the present invention is to obviate all these drawbacks and imperfections. To achieve this object, the inventors set themselves the task to develop a multiple-spindle arrangement for continuous tapping of holes in small workpieces, nuts in particular, with the assumption that optimum economical conditions, an easy and quick screw-tap replacement, adaptation to internal threading of various small details, and the elimination of causes of screw-tap breaking would be duly met.

This object has been achieved by the present invention which comprises a feed mechanism for the spindles, a mechanism for the reversing spindle rotation, a rotary head with the working spindles slidably mounted therein with their axes parallel to the axis of the head, and a holder disk secured to this rotary head and provided on its periphery with sockets, coaxial with the axes of the spindles to receive the workpiece to be threaded.

The feed mechanism has a fixed crown cam coaxial with, the disk of the multiple-spindle head. The working spindles are provided with spring shock-absorbers comprising attachments secured on spindle noses and sliding pins shiftably seated therein with one end mating with the springs and the other end sliding on the cam. The characteristics of springs are such that spring deflection with some definite axial force acting on the screw-tap serves as a safeguard to prevent damage of the screw-tap. The working spindles are driven to rotate in one or the other direction and also move with a rectilinear reciprocating motion; both motions are inter-coupled.

The mechanism for reversing the rotation of the working spindles incorporates the crown cam mating with an arm of a claw coupling slidably seated on each spindle, this arm of the claw coupling being provided with an element for transmitting motion, for instance a running roller. The disk of the multiple-spindle head is rotatably mounted on a fixed body. Inside a sleeve in the body there is disposed, concentrically therewith, a power transmission shaft with a gear wheel mounted thereon to drive, via other gear wheels, the working spindles in one working direction only. The sleeve and the gear wheel drive the working spindles in the reverse rotational direction by means of gear wheels mounted on the spindles.

The arrangement as disclosed by this invention makes it possible to perform in a continuous process the tapping of holes in several workpieces simultaneously by means of an adequate number of spindles. The machine may be used for tapping diverse tiny details, nuts in particular, since the possibility has been created for selecting the required shape of sockets in the holder disk according to the given form or size of the workpiece to be tapped, which fact is impossible when dealing with the bent screw-taps.

This arrangement affords the application of conventional commercial screw-taps thus cutting the operating costs considerably. It is additionally provided with a relatively simple mechanism incorporating a crown cam to enable control of both the feed movement of the working spindles, as well as, simultaneous reversal of rotation of these spindles along with a change in feed movement direction. Owing to this, the arrangement according to the invention is much less complicated, smaller and more economical compared to other known automatic spindle carriers. To eliminate the risk of screw-tap breakages occurring e.g. as a result of workpiece being incidentally fed without hole made therein, the working spindles of the machine are supplied with spring shock-absorbers co-operating with the crown cam and eliminating, in this specific case, the feed movements of the screw-tap and producing only a not too strong pressure towards the workpiece. The risk of screw-tap breakage, due to tappings, has been also obviated compared to the known spindle carrier automatics with bent screw-taps. Besides, the new machine is characterized in that its screw-taps may be changed with ease and in a very short time.

The means the accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

FIG. 3 is a section view taken along line A—A in FIG. 2 showing the holder disk;

FIG. 4 is a section view taken along line B—B in FIG. 2 showing the feed movement cam;

FIG. 5 is a side view of the feed movement cam;

FIG. 6 is a partial section view through the cam-operated coupling mechanism for reversing the direction of spindle rotation; and FIG. 7 is a section view of the working spindle shock absorber with its sliding pin.

Figure 1:
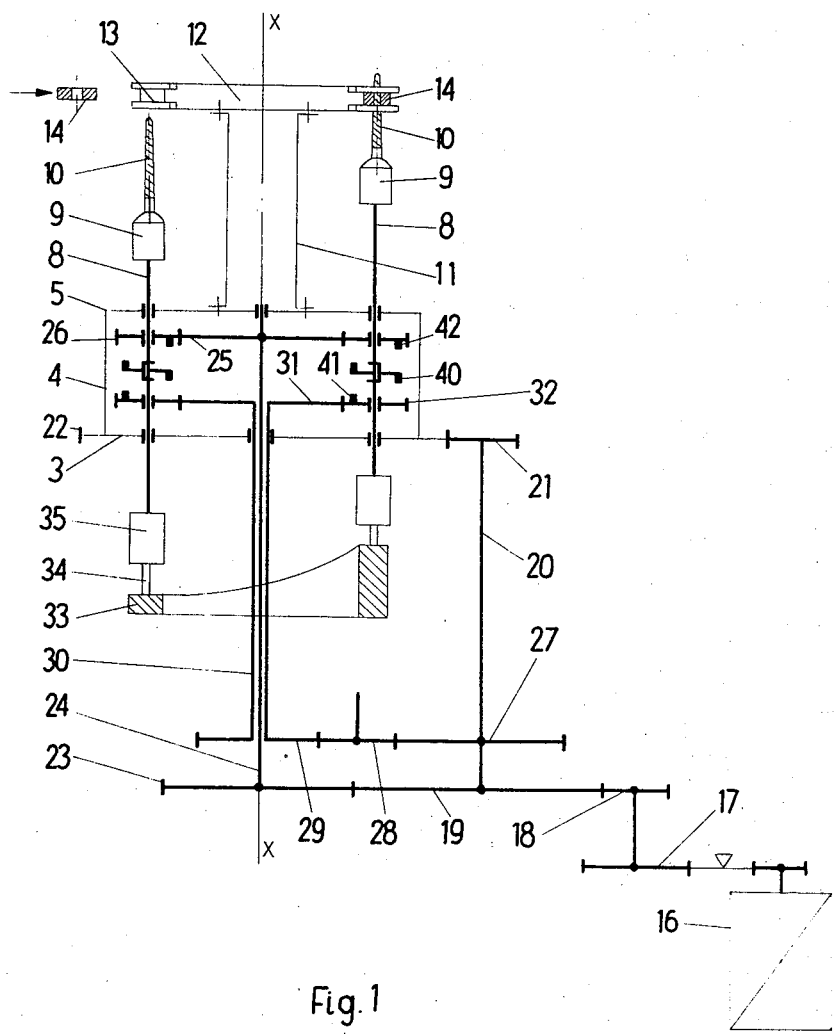
FIG. 1 is a schematic diagram of the inventive device for tapping holes in nuts.
Figure 2:
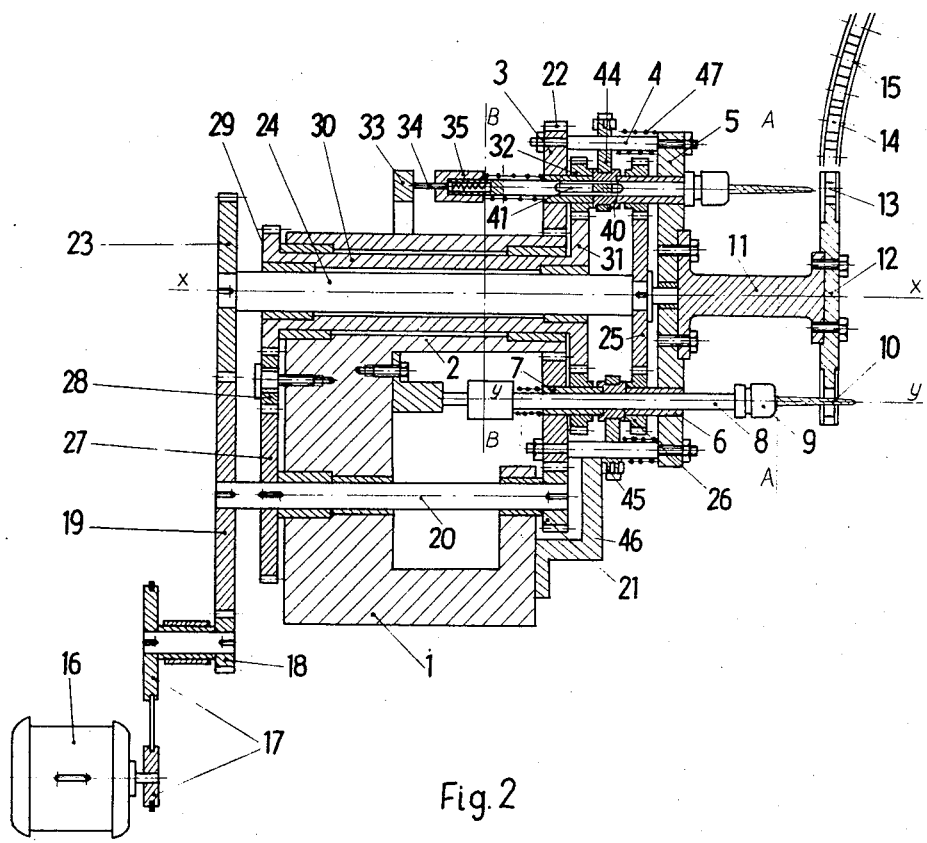
FIG. 2 is a simplified sectional view of the device taken along the axis of rotation of the head and disk.

The arrangement according to the invention, as shown in an exemplary embodiment on the accompanying drawings, consists of the following main assemblies; a power unit located inside a stationary body 1; a head rotatably mounted in said body and outfitted with a set of spindles; a holder disk 12 coupled with the head; feed movement mechanism; and a mechanism for reversing the direction of spindle rotation when the direction of feed movement is changed.

In the body 1, a rotary head is rotatably mounted in a horizontal sleeve 2. The head comprises a rear disk 3 and a front disk 5 connected thereto by means of crossbars 4. The working spindles 8 are mounted in pilot sleeves 6 and 7, whose y — y axes are parallel with the x — x axis of the head. Holders 9 are located at the end of these spindles with screw-taps 10 mounted therein. The front disk 5 carries a holder disk 12 fitted thereto by means of shaft 11. Holder disk 12 has on its periphery a set of sockets 13 corresponding in number and location to spindles 8 disposed on the head. Workpieces, such as nuts 14, are fed from mechanical feeder 15 into the sockets.

The power unit for imparting reversible rotary motion to spindles 8 and rotary motion to heads 3 and 5 with holder disk 12, consists of a driving motor 16 driving, through the agency of V-belt transmission 17 and toothed gears 18 and 19, the shaft 20. From shaft 20, the drive is transmitted by means of gear wheel 21 to toothed ring 22 of the rear disk 3 thus driving the head and the holder disk 12 into rotation about axis x — x.

Simultaneously, the drive is transmitted from gear wheel 19 via gear wheel 23 to shaft 24 and gear wheel 25 seated thereon and meshing with wheels 26 idling on pilot sleeves 6 of spindles 8 thus causing, after engagement with these spindles, their rotation in one direction e.g. clockwise.

At the same time, the drive is transmitted also from shaft 20 via gear wheels 27, 28, and 29 to the rotary sleeve 30 and therefrom via gear wheel 31 to gear cluster 32 rotatably mounted on pilot sleeves 7 of spindles 8 thus causing, after engagement of these wheels with the spindles, their rotation in the reverse direction e.g. counterclockwise.

The feed movement mechanism consists of a fixed crown feed cam 33 with sliding pins 34 of spindles 8 moving thereon. To obviate the risk of screw-tap damage, should the screw-tap meet too high a resistance, spindle 8 noses are provided with shock absorbers composed of member 35 with a sliding pin 34 movably mounted in a central opening and equipped with a guide member 36 movably mounted in an axial bore 37 of spindle 8 nose and pressing against spring 38. The characteristic of spring 38 is selected so that when a predetermined axial force acting on the sliding pin 34 is exceeded the spring exerts a force. To produce return movement of spindles 8, springs 39 are mounted on spindles 8 and connected to members 35.

The mechanism for reversing spindle 8 rotation with an instant change in feed movement direction, consists of movably mounted claw couplings 40 movably keyed in oblong openings 41 of spindles 8, and of claws 42 mating therewith and provided on gear wheels 26, and of claws 43 on gear wheels 32. For moving claw couplings 40, the arm of coupling 44 is movably mounted on arms 4 and provided at its end with rollers 45 running on the crown cam 46 and pressed against it by springs 47 seated on arms 4.

In the exemplary constructional embodiment presented in the drawing, the rotary head 3, 5 of the arrangement is fitted with eight spindles and eight corresponding sockets 13 in the disk 12. A full rotation of the head and disk 12 conforms to one complete tapping cycle of the nut 14, the angle $\alpha$ (see FIGS. 3 and 4) corresponding to the movement of the spindle towards the nut, the angle $\beta$ — to the internal threading of nuts, the angle $\gamma$ — to the unthreading of screw-tap from the nut, and the angle $\delta$ — to the movement of the screw-tap away from the nut i.e. to the extraction of the nut from the socket 13 of the disk. In this connection, the crown cam 33 has such a form of the working surface (FIGS. 4 and 5) as to render possible coupling of the feed movement of working spindles 8 to complete definite working operations under certain cycle conforming to one rotation of the head and holder disk 12.

Similarly, the shape of the crown cam 46 ensures displacement of the claw couplings 40 so that the rotational direction of the working spindle 8 rotations reverses at the instant there is to a change in the feed movement direction.

Operation of the above described arrangement illustrating, by way of example, the method of hole tapping (internal-threading) according to the invention is as follows:

In the upper position of the socket 13 the latter is automatically loaded with nut 14 delivered from mechanical feeder 15. As the holder disk 12 rotates through an angle $\alpha$ the spindle 8 corresponding to socket 13 simultaneously moves axially thus bringing forward the screw-tap 10 mounted in the holder 9 to establish its contact with the nut seated in the socket 13. The spindle 8 and the head 3, 5 rotate, at the same time, along with the holder disk 12. Further rotation of the disk 12 and the head coupled thereto through a central angle $\beta$ corresponds to the action of tapping a hole in the nut 14 by the screw-tap 10. For this purpose, a clockwise rotary working motion is imparted to the spindle 8 from shaft 24 via gear wheels 25 and 26 and claw coupling 40 coupling to the last and wedged on spindle 8, and then there follows also the feed movement complying with the required thread pitch enforced by the crown cam 33 acting on the sliding pin 34 of the spindle 8 shock absorber. With the tapping process ended at point 48 corresponding to the apex of cam 33 there follows a change in the direction of feed movement as a result of further downward movement of the sliding pin 34 along the descending working surface of cam 33, and simultaneously, due to the action of cam 46 exerted on roller 45 of the coupling 40, the latter is moved in the left-hand direction to engage gear wheel 32 and thus to reverse the direction of spindle rotation, which spindle is now driven by the sleeve 30 and gear wheels 31 and 32 to rotate in the reverse direction. Still further rotation of the holder disk 12 and head through the angle δ is linked with the action of threading the screw-tap 10 out of the hole of the nut 14, and after complete removal of the screw-tap from the nut hole, said screw-tap is moved away from the holder disk 12 which process corresponds to disk rotating through angle δ; and by the same the nut is thrown out by the force of gravity or else by a type of ejector not shown in drawing. During the continued rotation of the holder disk 12 and head 3, 5 the working cycle of the working spindle 8 and its corresponding socket 13 is repeated. It should be, however, noted that during one full rotation, all spindles and their corresponding holder disk sockets are simultaneously in operation so that a simultaneous machining of an adequate number of holes in nuts or other workpieces seated in these sockets may proceed.

What we claim is:

1. A multiple-spindle apparatus for tapping holes in small workpieces, particularly in nuts, by means of screw-taps comprising a rotary head, a first shaft mounting said head, a plurality of working spindles mounted on said head with their axes parallel to the axis of rotation of said head, a holder disk having a plurality of workpiece receiving means on its periphery each in alignment with one of said spindles, said holder disk being rotatably solid with said head, self-acting mechanical feeder means arranged to feed the workpieces to said holder disk, a spindle feed means and means to drive said spindles in rotation, each said working spindle having a screw-tap mounted on one end and resilient shock absorber means on the opposite end, said shock absorber means comprising holders fixed on the working spindle, pin means axially movable in said holder, and spring means disposed inside the holders biasing said pins to extend out of said holders, and further comprising first gear wheel means mounted on said first shaft, second gear wheel means mounted coaxially with said working spindles and engageable therewith, said second gear wheel means operatively engaging said first gear wheel means, third gear wheel means mounted on said first shaft, and means connecting said third gear wheel means to said drive means, wherein when said second gear wheel means is engaged with said working spindles said spindles rotate in a direction opposite to their direction of rotation when in a working mode.

2. An apparatus as claimed in claim 1, wherein the feed mechanism comprises a crown feed cam concentric with the axis of rotation of the head, said spindles contacting said cam and being axially driven thereby.

3. An apparatus as claimed in claim 1, wherein the means for driving the working spindles in rotation comprises a crown cam, a claw coupling movably mounted on each working spindle with an arm thereof engaging with said cam, and gear members selectively engaging with said coupling to drive said spindle into rotation.

4. An apparatus as claimed in claim 1, further comprising a fixed body having an annular opening therethrough, a sleeve and a drive shaft concentrically mounted in said opening, gear wheel means on each of said sleeve and shaft for driving the working spindles in each direction of rotation.

* * * * *